United States Patent [19]

Bohman

[11] Patent Number: 4,883,965
[45] Date of Patent: Nov. 28, 1989

[54] METHOD AND APPARATUS FOR DISCRIMINATING BETWEEN STALKS AND LEAVES IN A NON-CONTACT ROW CROP HARVESTER GUIDANCE SYSTEM

[75] Inventor: Carl E. Bohman, New Holland, Pa.
[73] Assignee: Ford New Holland, Inc., New Holland, Pa.
[21] Appl. No.: 288,360
[22] Filed: Dec. 22, 1988
[51] Int. Cl.$^4$ .................... A01D 75/00; G01N 21/59
[52] U.S. Cl. .................... 250/341; 250/349; 56/10.2
[58] Field of Search .................... 56/10.2, DIG. 15; 250/341, 349, 215, 239; 340/901

[56] References Cited

U.S. PATENT DOCUMENTS 3,583,514  6/1971  Taylor .................... 56/10.2
4,077,488  3/1978  Bennett, Jr. et al. .................... 56/10.2
4,528,804  7/1985  Williams .................... 56/10.2

FOREIGN PATENT DOCUMENTS 2455836  12/1976  Fed. Rep. of Germany ....... 56/10.2

Primary Examiner—Carolyn E. Fields
Attorney, Agent, or Firm—Griffin, Branigan & Butler

[57] ABSTRACT

A row crop harvesting machine is provided with first and second infra-red transmitters and first and second infra-red receptors for sensing the infra-red beams emitted by the transmitters. The transmitters and receptors are mounted on two adjacent crop row separators of a harvesting machine header and are positioned such that the beams intersect in a region which defines the alignment of the harvesting machine relative to a row of crop stalks. The intensities of the beams and the sensitivities of the receptors are such that the receptors may sense the beams through leaves but not through stalks.

5 Claims, 1 Drawing Sheet

METHOD AND APPARATUS FOR DISCRIMINATING BETWEEN STALKS AND LEAVES IN A NON-CONTACT ROW CROP HARVESTER GUIDANCE SYSTEM

RELATED APPLICATIONS

This application is related to my concurrently filed application Ser. No. 288,598 entitled Non-Contact Sensing Unit For Harvester Guidance System, the disclosure of which is incorporated herein by reference.

BACKGROUND OF THE INVENTION

My concurrently filed application Ser. No. 288,598 entitled Non-Contact Sensing Unit For Row Crop Harvester Guidance System discloses a guidance system for detecting the location of a harvesting machine relative to the stalks of a crop row and producing output signals for automatically steering the harvesting machine or producing steering control indications for visually indicating to an operator how he should steer the harvesting machine in order to keep or bring the harvesting machine into alignment with a row of crop stalks. The guidance system includes first and second energy beam transmitters and first and second receptors for receiving the energy beams transmitted by the transmitters The transmitters and receptors are positioned on two adjacent crop row separators of the header which is mounted on the harvesting machine ahead of its cutting mechanism. The transmitters and receptors are mounted such that the energy beams emitted by the two transmitters intersect in a region midway between the crop row separators whereby, if the two beams are interrupted substantially simultaneously by a crop stalk, the harvesting machine is aligned with the crop row. If one beam is intercepted before the other it is an indication that the harvesting machine is not aligned with the crop row. A time comparison circuit is responsive to output signals from the beam receptors to produce steering control signals indicating how the harvesting machine must be steered in order to bring it into alignment with the row of crop stalks.

As explained in the related application, the lower leaves of some stalk crops pass through the energy beams. Where two transmitters transmit intersecting energy beams to two receptors these leaves cause false indications of stalks, and cause the guidance system to fail to sense some stalks. To overcome this problem the related application discloses that plural transmitter/receptor pairs may be provided with the two beams of each transmitter/receptor pair intersecting in region midway between two dividers and the points of intersection of the two transmitter/receptor pairs lying in a straight line extending vertically midway between the two dividers.

It has been found that if the beams transmitted by the transmitters are infra-red energy beams of sufficient intensity, and the receptors are infra-red energy sensors having a desired degree of sensitivity, then a single transmitter/receptor pair may distinguish between crop stalks and leaves. The stalks intercept the beams but the beams "Penetrate through", that is, they are sensed by the receptors through the leaves.

SUMMARY OF THE INVENTION

An object of the present invention is to provide a method and apparatus for discriminating between crop stalks and leaves in a non-contact row crop sensing system of the type having only first and second transmitters for generating intersecting infra-red beams which are sensed by first and second receptors.

An object of the invention is to provide a method of discriminating between stalks and leaves by generating two infra-red energy beams of sufficient intensity to be sensed through leaves but not stalks, the energy beams being transmitted in two paths which intersect in a region midway between two crop row separators of a harvesting machine header, and sensing said energy beams with infra-red sensor having a sensitivity sufficient to sense the energy beams after they have passed through a leaf but insufficient to sense the energy beams if the beams are intercepted by a stalk.

An object of the present invention is to provide a non-contact row crop guidance system having a single transmitter/receptor pair. Two infra-red transmitters and receptors are mounted on two adjacent crop row separators of a harvesting machine header. The transmitters and receptors are positioned on the crop row separators such that the beams transmitted by the transmitters are directed at respective ones of the receptors and the beams intersect at a point midway between the crop row separators. The energies of the transmitted beams and the sensitivities of the receptors are such that the receptors may sense the beams through leaves but are incapable of sensing the beams if they are intercepted by a stalk.

Other objects of the invention and its mode of operation will become apparent upon consideration of the following description and the accompanying drawings.

DETAILED DESCRIPTION OF THE INVENTION

Figure 1:
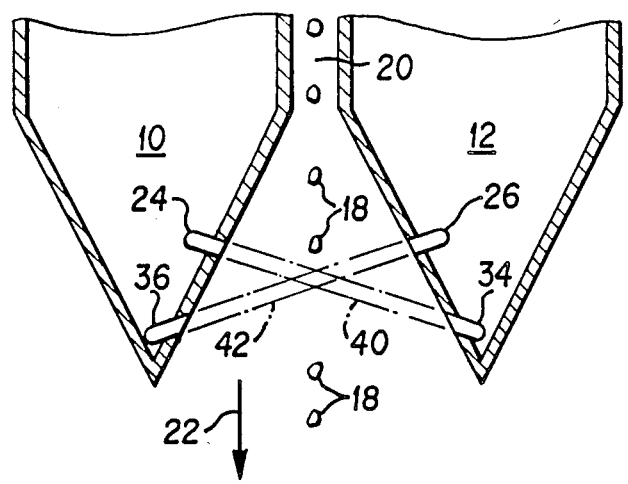
FIG. 1 is a top, part sectional view of a harvesting machine header showing two row crop row separators having a single transmitter/receptor pair mounted thereon; and, FIG. 2 is a circuit diagram of a non-contact row crop harvesting machine guidance system utilizing a single infra-red transmitter/receptor pair.
Figure 2:
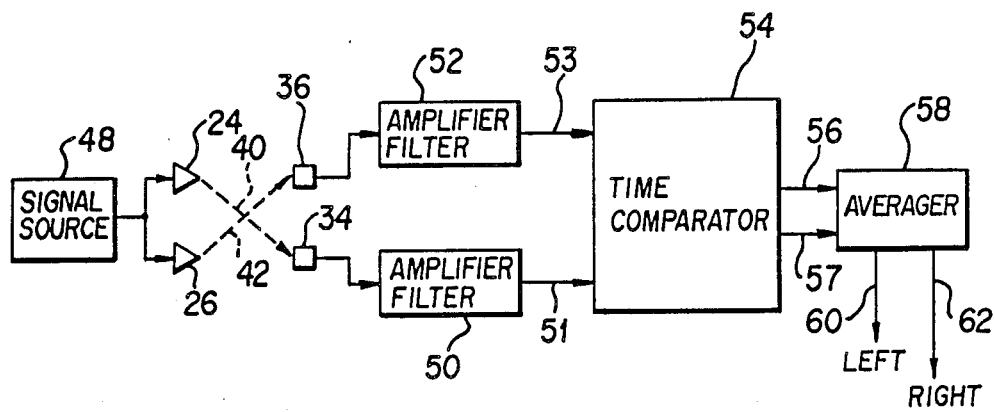

FIGS. 1 and 2 illustrate a harvesting machine guidance system as described in detail in related application Ser. No. 288,598 entitled Non-Contact Sensing Unit For Row Crop Harvester Guidance System, the disclosure of which is incorporated herein by reference. Briefly, two energy beam transmitters 24 and 26 and two energy beam receptors 34 and 36 are mounted on two adjacent crop row separators 10, 12 of a header which is carried on the front of a row crop harvesting machine. The harvesting machine (not shown) may be a combine, a pull-type or self-propelled harvester, or any conventional row crop harvester. The row separators 10 and 12 are provided with holes and the transmitters and receptors are mounted on the row separators so that energy beams 40 and 42, transmitted by transmitters 24 and 26, respectively, are received by receptors 34 and 36, respectively.

The two energy beams intersect midway between the crop row separators 10 and 12 so if the harvesting machine is aligned with a row of stalks 18, then each stalk will block or interrupt energy beams 40 and 42 at substantially at the same time as the harvesting machine moves in the direction of arrow 22. On the other hand, if the harvesting machine is too far to the right or left (looking in the direction of arrow 22) then one energy beam 40 or 42 will be interrupted before the other one is interrupted.

As shown in FIG. 2, the energy beam transmitters 24 and 26 are energized by a signal source 48 which may be modulated or unmodulated. The transmitters may produce sonic, subsonic, visible light or infra-red energy beams. The output signals produced by energy beam receptors 34 and 36 are applied through amplifier and filter circuits 50 and 52, respectively, to a time comparator 54. The time comparator determines the relative time sequence in which the energy beams 40 and 42 are blocked by crop stalks as the harvesting machine moves along a crop row. The time comparator 54 produces output signals which are applied to an averaging and threshold circuit 58 which is fully described with reference to FIG. 3 of the aforementioned related application. The averaging circuit produces two steering control signals on output leads 60 and 62 which may be applied to the steering control mechanism for automatic guidance of the harvesting machine, or may be applied to indicators to indicate to an operator how he should steer the harvesting machine to keep it in alignment with the row of crop stalks 18.

The above-referenced related application describes an apparatus for discriminating between leaves and stalks, the apparatus comprising plural pairs of intersecting energy beams. This arrangement requires at least four energy beam transmitters and four receptors.

It has been found that if the transmitters 24 and 26 are infra-red energy beam transmitters the intensity of the beams is raised sufficiently, the beams are concentrated, and the receptors 34 and 36 are sufficiently sensitive, then the transmitted energy beams will "Penetrate through" leaves but not crop stalks. That is, the receptors can sense the transmitted energy beams through leaves but cannot sense the energy beams through crop stalks.

The type SM31EL emitters and type SM31RL receptors commercially available from Banner Engineering Corporation are suitable for use as the energy beam transmitters and receptors, respectively. These devices are described in the specification bulletin entitled MINI-BEAM SM31EL/RL Self-Contained DC Opposed Mode Sensor Pair published by Banner Engineering Corporation. The transmitters produce an effective beam size of about ⅜" and the receptors have a millisecond response time.

From the foregoing descirption it is seen that the present invention provides a novel method and apparatus for discriminating between leaves and stalks in a harvesting machine guidance system, said method and apparatus requiring only two infra-red energy beam transmitters and two infra-red energy beam receptors.

While a specific preferred embodiment has been described herein, it will be understood that various modifications and substitutions may be made in the described embodiment without departing from the spirit and scope of the invention as defined in the appended claims.

The embodiments of the invention in which an exclusive property or privilege is claimed are defined as follows.

I claim:

1. In a guidance system for a row crop harvesting machine operable to move along a row of crop stalks, a method of discriminating between crop stalks and weeds, said method comprising:

providing first and second infra-red energy beam transmitters for producing first and second infra-red energy beams which cross a crop row and intersect at a crop row when the harvesting machine is aligned with the crop row;

providing first and second infra-red energy beam receptors for sensing said first and second infra-red energy beams, respectively; and, energizing said first and second energy beam transmitters to produce said first and second energy beams of sufficient intensity that said first and second infra-red energy beam receptors sense said first and second infra-red energy beams through leaves but not through crop stalks wherein said first and second infra-red energy beam receptors produce output signals only when said first and second infra-red energy beams, respectively, are blocked by crop stalks.

2. The method as claimed in claim 1 and comprising the step of analyzing the output signals produced by said first and second infra-red energy beam receptors and producing steering control signals for guiding said harvesting machine along the crop row.

3. In a guidance system for a row crop harvesting machine operable to move along a row of crop stalks, apparatus for discriminating between crop stalks and weeds, said apparatus comprising:

first and second infra-red energy beam transmitters for producing first and second infra-red energy beams which cross a crop row and intersect at a crop row when the harvesting machine is aligned with the crop row;

first and second infra-red energy beam receptors for sensing said first and second infra-red energy beams, respectively; and, means for energizing said first and second energy beam transmitters to produce said first and second energy beams with sufficient intensity that said first and second infra-red energy beam receptors sense said first and second energy infra-red energy beams through leaves but not through crop stalks wherein said first and second infra-red energy beam receptors produce output signals only when said first and second infra-red energy beams, respectively, are blocked by crop stalks.

4. The apparatus as claimed in claim 3 and further comprising means for analyzing the output signals produced by said first and second infra-red energy beam receptors and producing steering control signals for guiding said harvesting machine along the crop row.

5. In a row crop harvesting machine guidance system, a method of discriminating between crop stalks and leaves, said method comprising:

providing first and second infra-red energy beam receptors and first and second energy beam transmitters on said harvesting machine and positioned on said harvesting machine so that infra-red energy beams transmitted by said first and second transmitter are directed toward said first and second receptors, respectively, and said first and second beams intersect at a crop row of a row crop when said harvesting machine is aligned with said crop row; and, energizing said transmitters to generate first and second infra-red energy beams of sufficient power such that said beams may be sensed by said respective receptors after passing through a leaf but said beams are blocked from the respective receptors by crop stalks as said harvesting machine moves along said crop row.

* * * * *